United States Patent [19]
Johnson

[11] Patent Number: 5,468,010
[45] Date of Patent: Nov. 21, 1995

[54] HAND TRUCK APPARATUS

[76] Inventor: Marion K. Johnson, 224 Tiger Cir., Gilbert, S.C. 29054

[21] Appl. No.: 283,846

[22] Filed: Aug. 1, 1994

[51] Int. Cl.[6] ................................................. B62B 1/02
[52] U.S. Cl. ........................ 280/652; 280/47.27; 414/490
[58] Field of Search ........................... 280/47.27, 47.28,
280/47.29, 47.24, 47.19, 652, 659, 639,
654; 414/490, 529–536; 14/72.5, 70, 69.5,
21.1; D34/24, 26, 28, 32, 29; 410/51; 193/35 TE,
35 R; 180/9.1, 19.1, 9.22

[56] References Cited

U.S. PATENT DOCUMENTS

| | | | |
|---|---|---|---|
| 783,241 | 2/1905 | Bisset . | |
| 1,374,379 | 4/1921 | Klein | 280/47.29 |
| 1,425,727 | 8/1922 | Wallstrom . | |
| 2,360,799 | 10/1944 | Slingsby | 414/529 X |
| 2,534,868 | 12/1950 | Johnston | 414/529 X |
| 2,707,585 | 5/1955 | Hoey | 414/529 X |
| 2,806,708 | 9/1957 | Finstad | 280/47.27 |
| 2,820,643 | 1/1958 | Cohn | 280/47.27 X |
| 3,022,090 | 2/1962 | Olney | 414/529 X |
| 3,092,200 | 6/1963 | Chambers | 280/47.27 |
| 3,112,042 | 11/1963 | Leshner | 414/490 |
| 3,113,654 | 12/1963 | Kirsch | 193/35 R |
| 3,360,145 | 12/1967 | Bloxson et al. | 414/490 |
| 3,476,199 | 11/1969 | Kahn . | |
| 3,782,569 | 1/1974 | Montgomery | 414/529 |
| 3,907,322 | 9/1975 | Kiryu | 280/654 |
| 3,974,924 | 8/1976 | Ullman, Jr. | 414/531 |
| 4,217,967 | 8/1980 | Kaye . | |
| 4,341,393 | 7/1982 | Gordon et al. | 280/47.27 |
| 4,681,334 | 7/1987 | O'Brien | D34/24 |
| 4,726,602 | 2/1988 | Sanders et al. . | |
| 4,776,603 | 10/1988 | Watts . | |
| 4,921,270 | 5/1990 | Schoberg | 280/47.27 |
| 5,037,265 | 8/1991 | O'Brien | 414/373 |
| 5,158,032 | 10/1992 | Pitt . | |

FOREIGN PATENT DOCUMENTS

| | | | |
|---|---|---|---|
| 438248 | 12/1926 | Germany | 280/47.24 |
| 538977 | 8/1941 | United Kingdom | 280/47.24 |
| 2068305 | 8/1981 | United Kingdom | 280/47.24 |

*Primary Examiner*—Douglas C. Butler

[57] ABSTRACT

A hand truck apparatus includes a frame assembly, and a wheel assembly is carried by the frame assembly at the first end of the frame assembly. A platform assembly is connected to the first end of the frame assembly. A handle assembly is connected to the frame assembly at the second end of the frame assembly, and a plurality of roller assemblies are connected transversely between the lateral frame members. An extension assembly has a first end adapted to be connected to the second end of the frame assembly. The extension assembly includes a pair of lateral extension frame members spaced apart from each other by and connected to a pair of transverse extension frame members located at respective ends of the extension assembly. The extension assembly also includes a plurality of roller assemblies connected transversely between the lateral extension frame members. The platform assembly includes a first platform portion which extends forward of the frame assembly and includes a second platform portion which extends rearward of the frame assembly. The second platform portion includes receivers adapted for receiving a portion of the extension assembly for supporting the extension assembly. The frame assembly includes a retainer bar extending rearward from the lateral frame members. The retainer bar is adapted to retain the extension assembly adjacent to the lateral frame members when a bottom portion of the extension assembly is received in the receivers.

6 Claims, 4 Drawing Sheets

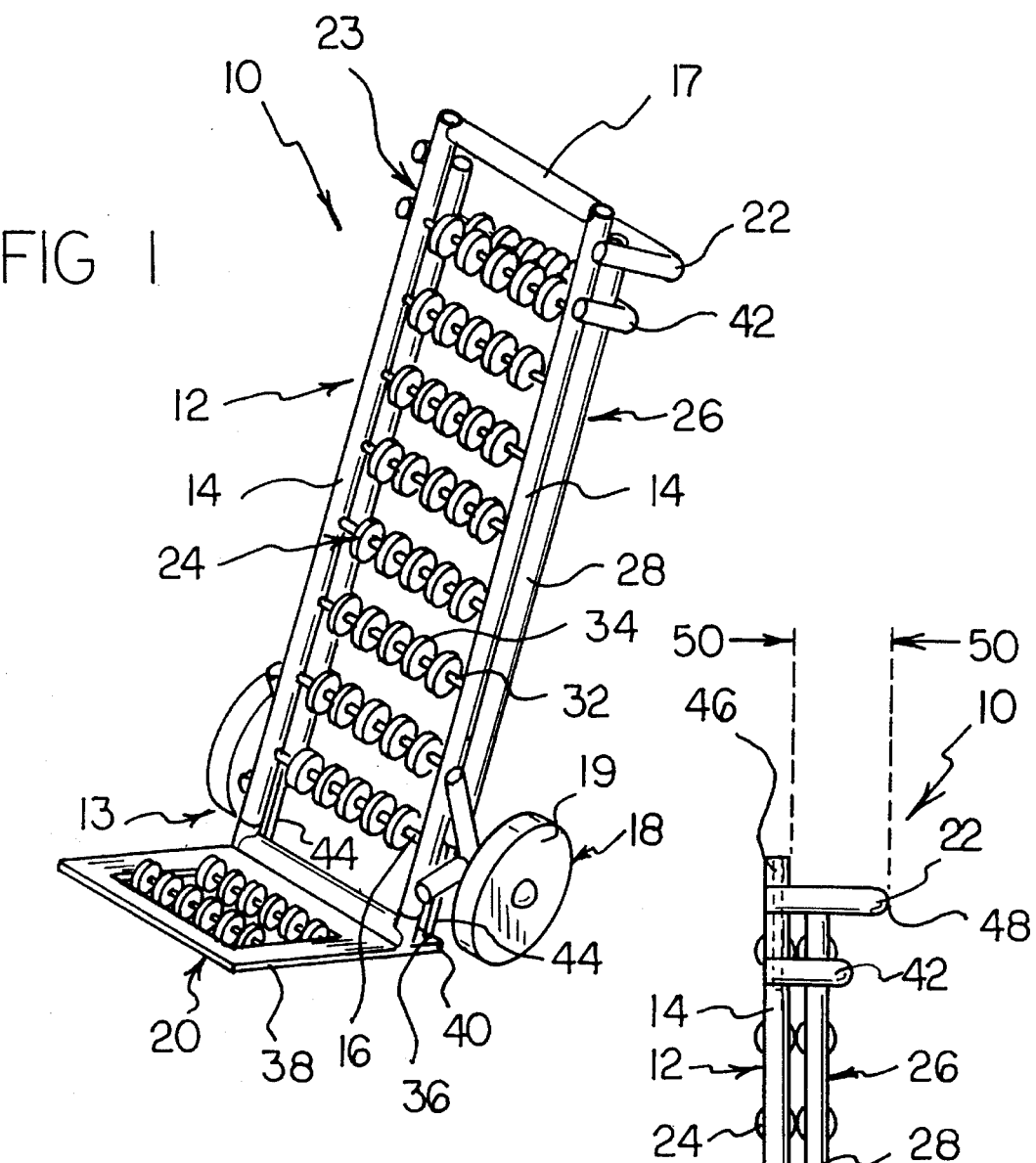

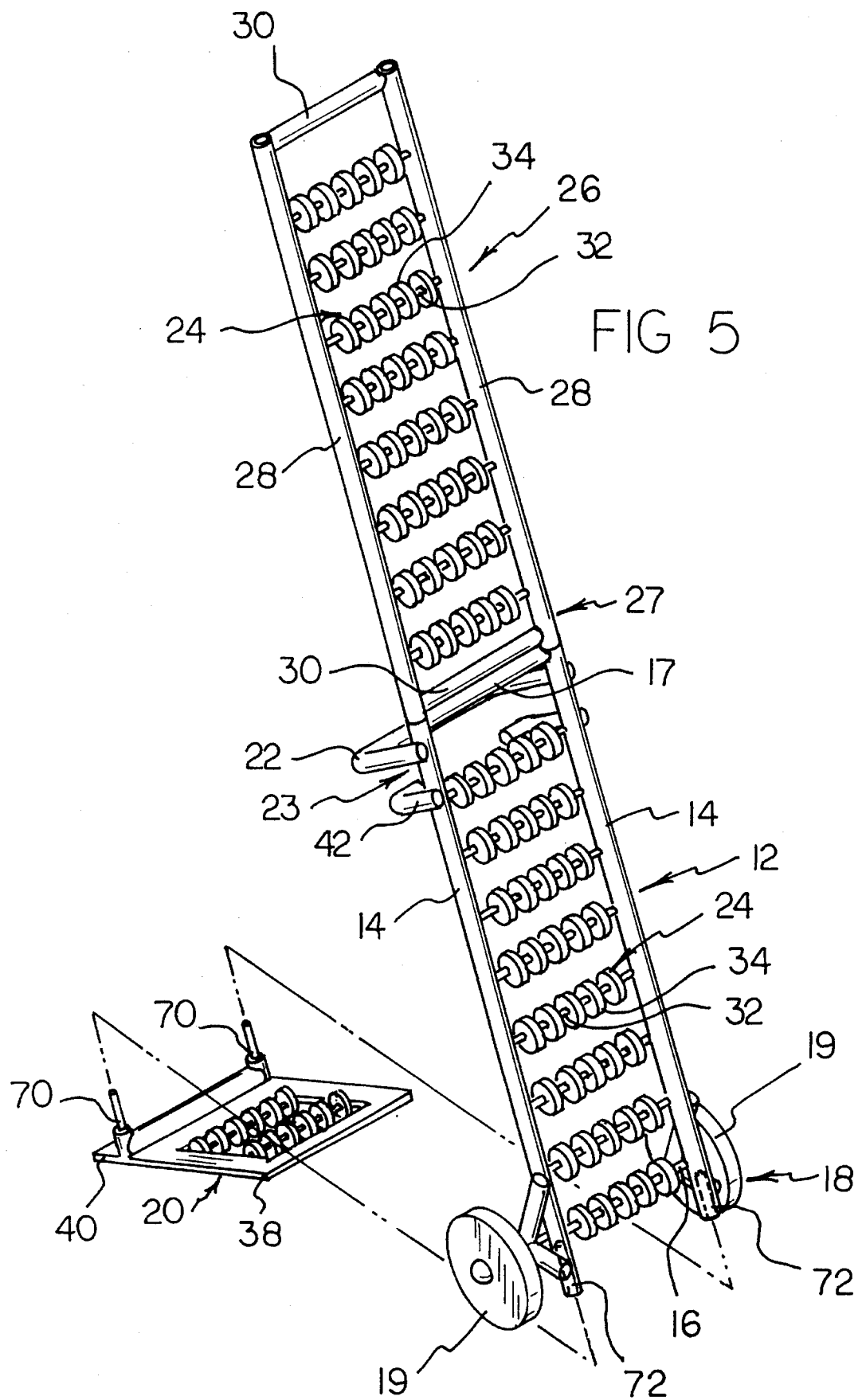

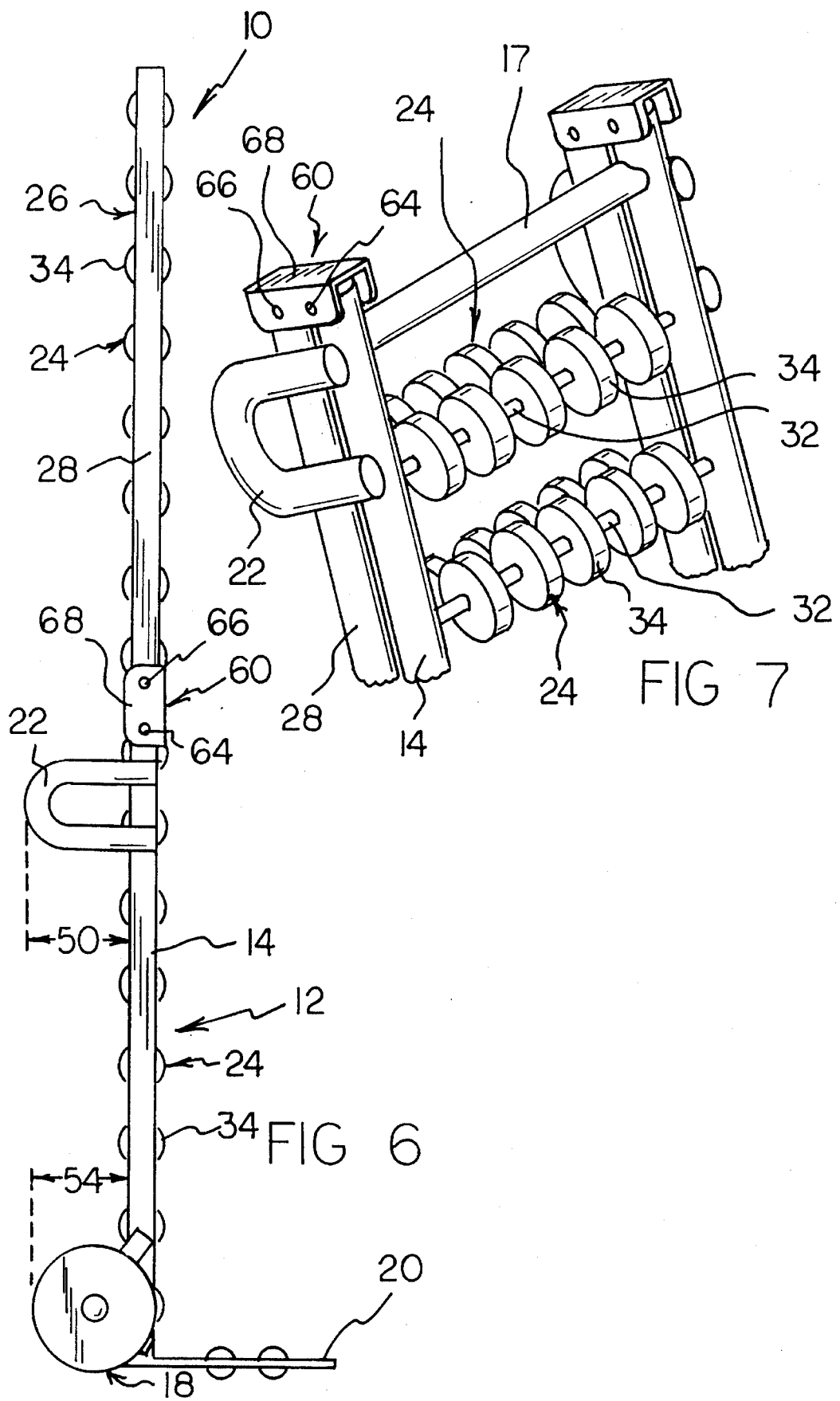

HAND TRUCK APPARATUS

BACKGROUND OF THE INVENTION

1. Field of the Invention

The present invention relates generally to wheeled, hand-operated vehicles and, more particularly, to hand trucks.

2. Description of the Prior Art

To move boxes and bulky packages that are too heavy and/or bulky to carry by hand, hand trucks are often employed. An exemplary hand truck is disclosed in U.S. Pat. No. 4,776,603. Generally, a hand truck has two wheels, a horizontally oriented platform, a vertically oriented frame assembly extending upward from the platform, and a hand-grip assembly supported by the frame assembly. The frame assembly generally includes vertically oriented peripheral frame members and transverse members connected between the peripheral members.

To move objects with a hand truck, the hand truck must first be loaded. The hand truck and objects are moved, and then the hand truck is unloaded. The load-move-unload cycle must be repeated each time the hand truck is used. There are instances, however, when one may wish to slide an object along a floor, or other horizontal surface, from one location to another without going through the load-move-unload cycle. In this respect, it would be desirable if a hand truck could be adapted for sliding objects along a horizontal surface.

Throughout the years, a number of innovations have been developed relating to hand trucks or other dollies designed to move objects from one location to another, and the following U.S. Pat. Nos. are representative of some of those innovations: 3,476,199; 4,217,967; 4,726,602; and 5,158,032. More specifically, U.S. Pat. No. 3,476,199 discloses a dolly for burial vaults. With this device, a motor and transmission assembly control the movement of the burial vault. To avoid the weight, expense, and overall complexities, it would be desirable if a hand truck were provided that enables rolling an object along the body of the hand truck without the use of a motor and transmission assembly.

U.S. Pat. No. 4,217,967 discloses a roller device that is motorized and provides a seat for an operator. A hand truck generally does not need a seat, and it would be desirable if a hand truck were provided that permits objects to be rolled along the body of the hand truck without having a seat for an operator.

U.S. Pat. No. 4,726,602 discloses a conventional hand truck that has an add-on framework to enable the hand truck to handle bulky freight. The add-on framework does not permit objects to be rolled along the body of the hand truck.

U.S. Pat. No. 5,158,032 discloses a dock dolly that does not permit an object from being rolled along the body of the dolly.

Still other features would be desirable in a hand truck apparatus. For example, in a hand truck that can be used for rolling objects along the body of the hand truck, it would be desirable if the path of object rolling can be extended beyond the length of the frame of the hand truck. In this respect, it would be desirable if an extension assembly for extending the path of rolling could be carried by the hand truck so that the extension is readily available for use. It may also be desirable if an extension assembly for the path of rolling objects along the body of the hand truck be attached to the hand truck in a folding manner.

When a hand truck is used for rolling objects along the body of the hand truck, it would be desirable if means were provided for maintaining the body of the hand truck in a horizontal orientation.

When the body of the hand truck is used as a platform for rolling objects, the horizontal platform of the hand truck may get in the way. In this respect, it would be desirable if a hand truck were provided in which the horizontal platform were easily removed and replaced.

Thus, while the foregoing body of prior art indicates it to be well known to use hand trucks and other wheeled devices for moving objects, the prior art described above does not teach or suggest a hand truck apparatus which has the following combination of desirable features: (1) can be adapted for sliding objects along a horizontal surface; (2) enables rolling an object along the body of the hand truck without the use of a motor and transmission assembly; (3) permits objects to be rolled along the body of the hand truck without having a seat for an operator; (4) permits extension of the path for rolling an object to be extended beyond the length of the frame of the hand truck; (5) carries an extension assembly for extending the path of rolling on the hand truck so that the extension assembly is readily available for use; (6) provides means for maintaining the body of the hand truck in a horizontal orientation when used for rolling objects along the body of the hand truck; (7) provides an extension assembly for the path of rolling objects along the body of the hand truck to be attached to the hand truck in a folding manner; and (8) provides that the horizontal platform can be easily removed and replaced. The foregoing desired characteristics are provided by the unique hand truck apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a hand truck apparatus which includes a frame assembly which includes a pair of lateral frame members spaced apart from each other by and connected to a first primary frame member located at a first end of the frame assembly and a second primary frame member located at a second end of the frame assembly. A wheel assembly is carried by the frame assembly at the first end of the frame assembly. A platform assembly is connected to the first end of the frame assembly. A handle assembly is connected to the frame assembly at the second end of the frame assembly, and a plurality of roller assemblies are connected transversely between the lateral frame members.

An extension assembly has a first end adapted to be connected to the second end of the frame assembly. The extension assembly includes a pair of lateral extension frame members spaced apart from each other by and connected to a pair of transverse extension frame members located at respective ends of the extension assembly. The extension assembly also includes a plurality of roller assemblies connected transversely between the lateral extension frame members.

The platform assembly includes a first platform portion which extends forward of the frame assembly and includes a second platform portion which extends rearward of the frame assembly. The second platform portion includes receivers adapted for receiving a portion of the extension assembly for supporting the extension assembly.

The frame assembly includes a retainer bar extending rearward from the lateral frame members. The retainer bar is adapted to retain the extension assembly adjacent to the lateral frame members when a bottom portion of the extension assembly is received in the receivers.

The lateral extension frame members of the extension assembly include peg elements adapted to be received in the receivers of the second platform portion of the platform assembly. The lateral frame members of the frame assembly include wells adapted to receive the peg elements of the extension assembly when the extension assembly is in a use mode.

Each of the roller assemblies includes an axle member connected transversely between the lateral frame members and a plurality of roller wheels supported by the axle member. The pair of lateral frame members, the first primary frame member, and the second primary frame member are contiguous to a common plane.

The wheel assembly includes wheels and wheel supports supporting the wheels. The wheel supports are connected to the frame assembly.

The handle assembly includes a distal portion which is positioned a first predetermined distance from the frame assembly. The wheels include a distal portion which is positioned a second predetermined distance from the frame assembly. The first predetermined distance is substantially equal to the second predetermined distance, such that the frame assembly is oriented substantially horizontal when the distal portion of the handle assembly and the distal portion of the wheels are placed on a horizontal surface.

The platform assembly includes a frame member connected to the first end of the frame assembly and a plurality of roller assemblies supported by the frame member. Each of the roller assemblies includes an axle member connected transversely between the lateral frame members. A plurality of roller wheels are supported by the axle member.

The platform assembly is selectively attachable and detachable from the frame assembly. The platform assembly includes peg elements adapted to fit into complimentary wells located within bottom ends of the lateral frame members of the frame assembly.

A hinge assembly is connected between the frame assembly and the extension assembly such that the extension assembly can be folded into a nonuse mode and can be unfolded into a use mode. The hinge assembly includes a first hinge pin connected to the frame assembly. A second hinge pin is connected to the extension assembly. A hinge bracket is connected to both the first hinge pin and the second hinge pin.

The first hinge pin is positioned on the frame assembly, the second hinge pin is positioned on the extension assembly, the hinge bracket is dimensioned and positioned between the first hinge pin and the second hinge pin such that when the extension assembly is folded in a nonuse mode, the extension assembly is positioned rearward of the frame assembly and such that the extension assembly can be moved to a use position in which the frame assembly and the extension assembly are substantially coplanar.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved hand truck apparatus which has all of the advantages of the prior art and none of the disadvantages.

It is another object of the present invention to provide a new and improved hand truck apparatus which may be easily and efficiently manufactured and marketed.

It is a further object of the present invention to provide a new and improved hand truck apparatus which is of durable and reliable construction.

An even further object of the present invention is to provide a new and improved hand truck apparatus which is susceptible of a low cost of manufacture with regard to both materials and labor, and which accordingly is then susceptible of low prices of sale to the consuming public, thereby making such hand truck apparatus available to the buying public.

Still yet a further object of the present invention is to provide a new and improved hand truck apparatus which can be adapted for sliding objects along a horizontal surface.

Still another object of the present invention is to provide a new and improved hand truck apparatus that enables rolling an object along the body of the hand truck without the use of a motor and transmission assembly.

Yet another object of the present invention is to provide a new and improved hand truck apparatus which permits objects to be rolled along the body of the hand truck without having a seat for an operator.

Even another object of the present invention is to provide a new and improved hand truck apparatus that permits extension of the path for rolling an object to be extended beyond the length of the frame of the hand truck.

Still a further object of the present invention is to provide a new and improved hand truck apparatus which carries an extension assembly for extending the path of rolling on the hand truck so that the extension assembly is readily available for use.

Yet another object of the present invention is to provide a new and improved hand truck apparatus that provides means for maintaining the body of the hand truck in a horizontal orientation when used for rolling objects along the body of the hand truck.

Still another object of the present invention is to provide a new and improved hand truck apparatus which provides an extension assembly for the path of rolling objects along the body of the hand truck to be attached to the hand truck in a folding manner.

Yet another object of the present invention is to provide a new and improved hand truck apparatus that provides that the horizontal platform can be easily removed and replaced.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other thanhose set forth above will become more apparent after a study of the following detailed description thereof. Such description makes reference to the annexed drawing wherein:

FIG. 1 is a perspective view showing a first preferred embodiment of the hand truck apparatus of the invention.

FIG. 2 is a side view of the embodiment of the hand truck apparatus shown in FIG. 1.

FIG. 5 is a perspective view, partially exploded, of the embodiment of the invention shown in FIG. 1 with an extension assembly added onto the body of the hand truck.

FIG. 6 is a side view of a second embodiment of the hand truck apparatus of the invention which includes an extension assembly connected to the hand truck body in a folding manner, wherein the extension assembly is in an unfolded orientation.

FIG. 7 is an enlarged, partial perspective view of the embodiment of the invention shown in FIG. 6 wherein the extension assembly is in a folded orientation.

DESCRIPTION OF THE PREFERRED EMBODIMENT

With reference to the drawings, a new and improved hand truck apparatus embodying the principles and concepts of the present invention will be described.

Figure 3:
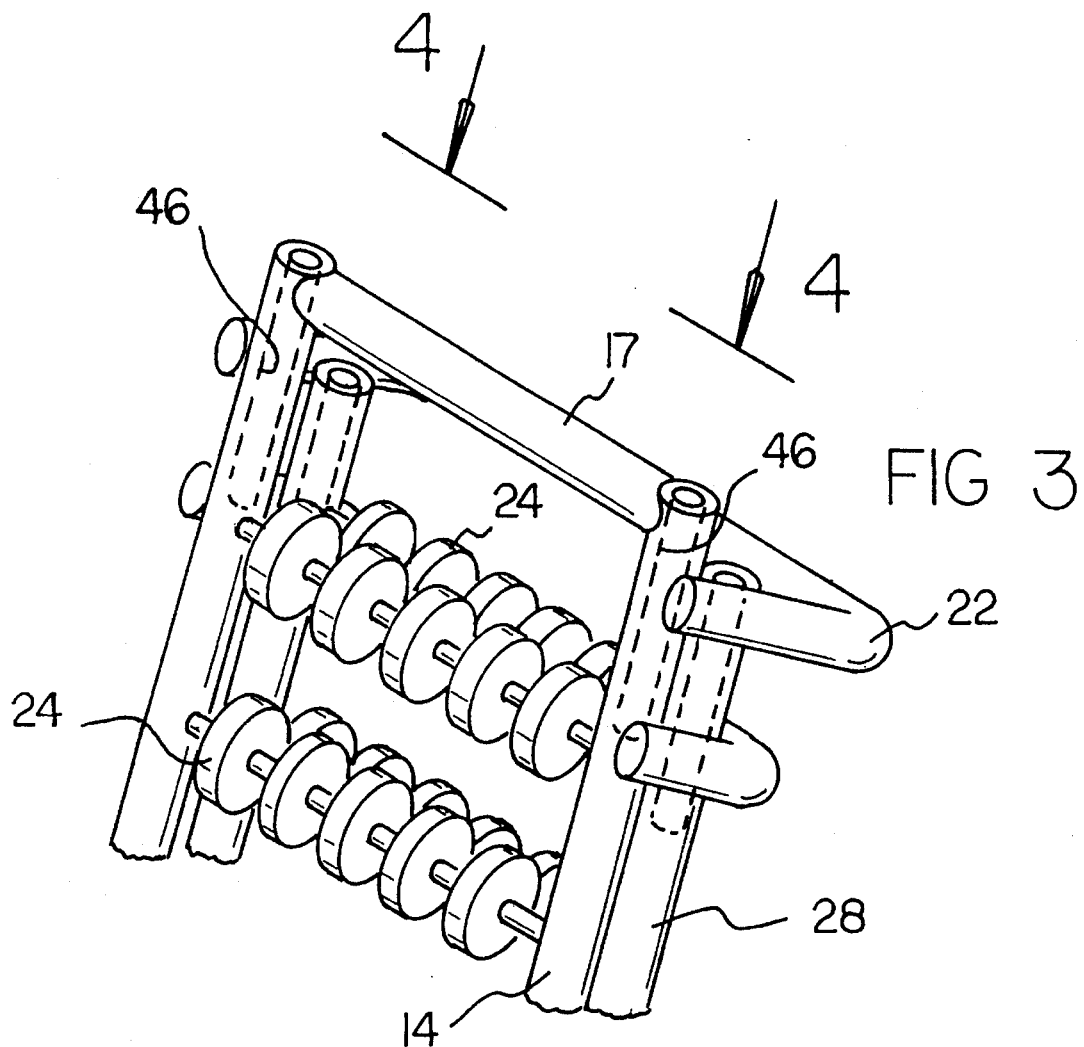
FIG. 3 is an enlarged, partial perspective view of the top portion of the embodiment of the hand truck apparatus of FIG. 1.
Figure 4:
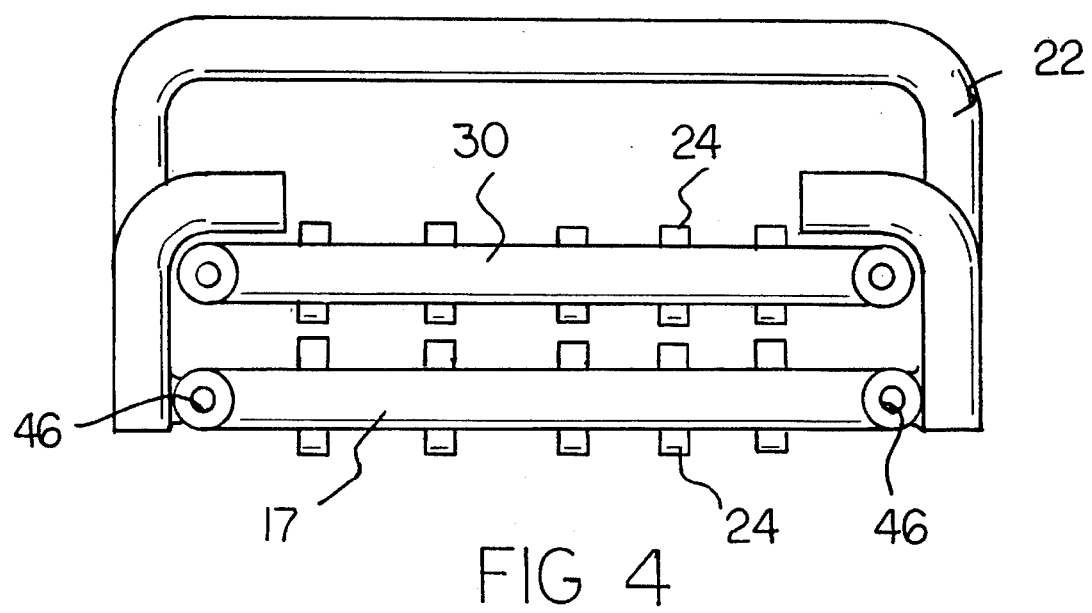
FIG. 4 is a top view of the embodiment of the invention shown in FIG. 3 taken along line 4—4 thereof.

Turning to FIGS. 1–5, there is shown a first exemplary embodiment of the hand truck apparatus of the invention generally designated by reference numeral 10. In its preferred form, hand truck apparatus 10 includes a frame assembly 12 which includes a pair of lateral frame members 14 spaced apart from each other by and connected to a first primary frame member 16 located at a first end 13 of the frame assembly 12 and a second primary frame member 17 located at a second end 23 of the frame assembly 12. A wheel assembly 18 is carried by the frame assembly 12 at the first end 13 of the frame assembly 12. A platform assembly 20 is connected to the first end 13 of the frame assembly 12. A handle assembly 22 is connected to the frame assembly 12 at the second end 23 of the frame assembly 12, and a plurality of roller assemblies 24 are connected transversely between the lateral frame members 14.

An extension assembly 26 has a first end 27 adapted to be connected to the second end 23 of the frame assembly 12. The extension assembly 26 includes a pair of lateral extension frame members 28 spaced apart from each other by and connected to a pair of transverse extension frame members 30 located at respective ends of the extension assembly 26. The extension assembly 26 also includes a plurality of roller assemblies 24 connected transversely between the lateral extension frame members 28.

The platform assembly 20 includes a first platform portion 38 which extends forward of the frame assembly 12 and includes a second platform portion 40 which extends rearward of the frame assembly 12. The second platform portion 40 includes receivers 36, e.g. apertures 36, adapted for receiving a portion of the extension assembly 26 for supporting the extension assembly 26.

The frame assembly 12 includes a retainer bar 42 extending rearward from the lateral frame members 14. The retainer bar 42 is adapted to retain the extension assembly 26 adjacent to the lateral frame members 14 when a bottom portion of the extension assembly 26 is received in the receivers 36.

The lateral extension frame members 28 of the extension assembly 26 include peg elements 44 adapted to be received in the receivers 36 of the second platform portion 40 of the platform assembly 20. The peg elements 44 of the extension assembly 26 fit into the receivers 36 of the platform assembly 20 when the extension assembly 26 is carried by the platform assembly 20 and is retained by the retainer bar 42, wherein the extension assembly 26 is in a storage mode. The lateral frame members 14 of the frame assembly 12 include wells 46 adapted to receive the peg elements 44 of the extension assembly 26 when the extension assembly 26 is in a use mode.

Each of the roller assemblies 24 includes an axle member 32 connected transversely between the lateral frame members 14 and a plurality of roller wheels 34 supported by the axle member 32. The pair of lateral frame members 14, the first primary frame member 16, and the second primary frame member 17 are contiguous to a common plane.

The wheel assembly 18 includes wheels 19 and wheel supports 21 supporting the wheels 19. The wheel supports 21 are connected to the frame assembly 12.

The handle assembly 22 includes a distal portion 48 which is positioned a first predetermined distance 50 from the frame assembly 12. The wheels 19 include a distal portion 52 which is positioned a second predetermined distance 54 from the frame assembly 12. The first predetermined distance 50 is substantially equal to the second predetermined distance 54, such that the frame assembly 12 is oriented substantially horizontal when the distal portion 48 of the handle assembly 22 and the distal portion 52 of the wheels 19 are placed on a horizontal surface.

The platform assembly 20 includes a frame member 25 connected to the first end 13 of the frame assembly 12 and a plurality of roller assemblies 24 supported by the frame member 25. Each of the roller assemblies 24 includes an axle member 32 connected transversely between the lateral frame members 14. A plurality of roller wheels 34 are supported by the axle member 32.

In use, as shown in FIGS. 1–4, the first embodiment of the invention is in a storage or nonuse mode. In this mode, the extension assembly 26 has its peg elements 44 inserted in the apertures 36 of the second platform portion 40 of the platform assembly 20, and the retainer bar 42 retains the top of the extension assembly 26 in a substantially vertical orientation rearward of the frame assembly 12.

As further shown in FIG. 5, the extension assembly 26 is in a use mode. More specifically, the extension assembly 26 has been removed from behind the frame assembly 12, and the peg elements 44 have been inserted in the wells 46 of the frame assembly 12. As shown in FIG. 5, the extension assembly 26 and the frame assembly 12 are substantially coplanar, providing a substantially continuous plane of roller assemblies 24 from the top end of the extension assembly 26 to the bottom end of the frame assembly 12. In this mode of operation, when the extension assembly 26 and the frame assembly 12 are placed in a horizontal orientation, the roller assemblies 24 can be used as an endless conveyor upon which objects can be slid from the top end of the extension assembly 26 to the bottom end of the frame assembly 12 or vice versa.

As shown in FIG. 5, the platform assembly 20 is selectively attachable and detachable from the frame assembly 12. The platform assembly 20 includes peg elements 70 adapted to fit into complimentary wells 72 located within bottom ends of the lateral frame members 14 of the frame assembly 12.

As shown in FIG. 5, when the platform assembly 20 is selectively removed from the frame assembly 12, the frame assembly 12 can be utilized as an endless conveyor. Moreover, with the platform assembly 20 removed from the frame assembly 12, the combination of the frame assembly 12 and the extension assembly 26 can be used as an extended endless conveyor.

Turning to FIGS. 6–7, a second embodiment of the invention is shown. Reference numerals are shown that correspond to like reference numerals that designate like elements shown in the other figures. In addition, a hinge assembly 60 is connected between the frame assembly 12 and the extension assembly 26 such that the extension assembly 26 can be folded into a nonuse mode and can be unfolded into a use mode. The hinge assembly 60 includes a first hinge pin 64 connected to the frame assembly 12. A second hinge pin 66 is connected to the extension assembly 26. A hinge bracket 68 is connected to both the first hinge pin 64 and the second hinge pin 66.

The first hinge pin 64 is positioned on the frame assembly 12, the second hinge pin 66 is positioned on the extension assembly 26, and the hinge bracket 68 is dimensioned and positioned between the first hinge pin 64 and the second hinge pin 66 such that when the extension assembly 26 is folded in a nonuse mode, the extension assembly 26 is positioned rearward of the frame assembly 12 and such that the extension assembly 26 can be moved to a use position in which the frame assembly 12 and the extension assembly 26 are substantially coplanar.

As shown in FIG. 6, the second embodiment of the hand truck apparatus 10 is shown in an unfolded orientation. In this orientation, the frame assembly 12 and the extension assembly 26 are coplanar. That is, the frame assembly 12 and the extension assembly 26 together form a single endless conveyor.

In FIG. 7, the second embodiment of the invention is shown in a folded orientation. That is, the extension assembly 26 is folded and positioned on the rearward side of the frame assembly 12. The components of the hand truck apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved hand truck apparatus that is low in cost, relatively simple in design and operation, and which may advantageously be used for sliding objects along a horizontal surface. With the invention, a hand truck apparatus is provided which enables rolling an object along the body of the hand truck without the use of a motor and transmission assembly. With the invention, a hand truck apparatus is provided which permits objects to be rolled along the body of the hand truck without having a seat for an operator. With the invention, a hand truck apparatus is provided which permits extension of the path for rolling an object to be extended beyond the length of the frame of the hand truck. With the invention, a hand truck apparatus is provided which carries an extension assembly for extending the path of rolling on the hand truck so that the extension assembly is readily available for use. With the invention, a hand truck apparatus provides means for maintaining the body of the hand truck in a horizontal orientation when used for rolling objects along the body of the hand truck. With the invention, a hand truck apparatus provides an extension assembly for the path of rolling objects along the body of the hand truck to be attached to the hand truck in a folding manner. With the invention, a hand truck apparatus provides that the horizontal platform can be easily removed and replaced.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by LETTERS PATENT of the United States is as follows:

1. A hand truck apparatus, comprising:

a frame assembly which includes a pair of lateral frame members spaced apart from each other by and connected to a first primary frame member located at a first end of said frame assembly and a second primary frame member located at a second end of said frame assembly, wherein said pair of lateral frame members, said first primary frame member, and said second primary frame member are contiguous to a common plane, a wheel assembly carried by said frame assembly at said first end of said frame assembly, wherein said wheel assembly includes two wheels located at said first end of said frame assembly and positioned laterally away from said pair of lateral frame members, wherein said wheel assembly includes wheel supports supporting said two wheels, wherein said wheel supports are connected to said frame assembly, a platform assembly connected to said first end of said frame assembly at substantially a right angle to said frame assembly, wherein said platform assembly includes a platform frame member connected to said first end of said frame assembly, and a plurality of roller assemblies supported by said platform frame member, wherein each of said roller assemblies includes an axle member connected transversely between opposite sides of said platform frame member, and a plurality of roller wheels supported by said axle member, a handle assembly connected to said frame assembly at said second end of said frame assembly, a plurality of roller assemblies connected transversely between said lateral frame members, wherein each of said roller assemblies includes an axle member connected transversely between said lateral frame members, and a plurality of roller wheels supported by said axle member, and an extension assembly having a first end adapted to be connected to said second end of said frame assembly, wherein said extension assembly includes a pair of lateral extension frame members spaced apart from each other by and connected to a pair of transverse extension frame members located at respective ends of said extension assembly, wherein said extension assembly also includes a plurality of roller assemblies connected transversely between said lateral extension frame members, wherein said lateral extension frame members of said extension assembly include peg elements, and wherein said lateral frame members of said frame assembly include wells adapted to receive said peg elements of said extension assembly when said extension assembly is in a use mode.

2. The apparatus of claim 1 wherein:

said platform assembly includes a first platform portion which extends forward of said frame assembly and includes a second platform portion which extends rearward of said frame assembly, said second platform portion includes receivers adapted for receiving a portion of said extension assembly for supporting said extension assembly, and said frame assembly includes a retainer bar extending rearward from said lateral frame members, said retainer bar being adapted to retain said extension assembly adjacent to said lateral frame members when a bottom portion of said extension assembly is received in said receivers.

3. The apparatus of claim 2 wherein said lateral extension frame members of said extension assembly include peg elements adapted to be received in said receivers of said second platform portion of said platform assembly.

4. The apparatus of claim 1 wherein said platform assembly is selectively attachable and detachable from said frame assembly.

5. The apparatus of claim 4 wherein said platform assembly includes peg elements adapted to fit into said lateral frame members of said frame assembly.

6. A hand truck apparatus, comprising:

a frame assembly which includes a pair of lateral frame members spaced apart from each other by and connected to a first primary frame member located at a first end of said frame assembly and a second primary frame member located at a second end of said frame assembly, wherein said pair of lateral frame members, said first primary frame member, and said second primary frame member are contiguous to a common plane, a wheel assembly carried by said frame assembly at said first end of said frame assembly, wherein said wheel assembly includes two wheels located at said first end of said frame assembly and positioned laterally away from said pair of lateral frame members, wherein said wheel assembly includes wheel supports supporting said two wheels, wherein said wheel supports are connected to said frame assembly, a platform assembly connected to said first end of said frame assembly at substantially a right angle to said frame assembly, wherein said platform assembly includes a platform frame member connected to said first end of said frame assembly, and a plurality of roller assemblies supported by said platform frame member, wherein each of said roller assemblies includes an axle member connected transversely between opposite sides of said platform frame member, and a plurality of roller wheels supported by said axle member, a handle assembly connected to said frame assembly at said second end of said frame assembly, a plurality of roller assemblies connected transversely between said lateral frame members, wherein each of said roller assemblies includes an axle member connected transversely between said lateral frame members, and a plurality of roller wheels supported by said axle member, and an extension assembly having a first end adapted to be connected to said second end of said frame assembly, wherein said extension assembly includes a pair of lateral extension frame members spaced apart from each other by and connected to a pair of transverse extension frame members located at respective ends of said extension assembly, wherein said extension assembly also includes a plurality of roller assemblies connected transversely between said lateral extension frame members, wherein said lateral extension frame members of said extension assembly include peg elements, and wherein said lateral frame members of said frame assembly include wells adapted to receive said peg elements of said extension assembly when said extension assembly is in a use mode, wherein said handle assembly includes a distal portion which is positioned a first predetermined distance from said frame assembly, wherein said wheels of said wheel assembly include a distal portion which is positioned a second predetermined distance from said frame assembly, and wherein said first predetermined distance is substantially equal to said second predetermined distance, such that said frame assembly is oriented substantially horizontal when said distal portion of said handle assembly and said distal portion of said wheels are placed on a horizontal surface.

* * * * *